… (United States Patent Office)

2,864,817

PROCESS FOR CRYSTALLIZATION OF ERYTHROMYCIN

Donald R. Croley, Indianapolis, Ind., assignor to Eli Lilly and Company, Indianapolis, Ind., a corporation of Indiana No Drawing. Application September 1, 1955
Serial No. 532,126

8 Claims. (Cl. 260—210)

This invention relates to erythromycin and more particularly to a novel process for the production of useful crystalline forms of erythromycin and to certain novel lattice-solvated crystalline forms of erythromycin employed in such process.

Erythromycin is an antibiotic which is obtained by culture of the microorganism Streptomyces erythreus upon suitable artificial nutrient culture media, as disclosed in United States Letters Patent No. 2,653,899. The antibiotic substance is commonly isolated from the fermented culture medium broth by removal of the solid portions of the broth and extraction of the remaining liquid employing immiscible organic solvent-water partition. Generally speaking, an intermediate point is reached at which the erythromycin in more or less crude form is present in aqueous solution as erythromycin base or as a water-soluble salt. The solution can be evaporated to dryness, or otherwise treated to recover the erythromycin present therein. The crude erythromycin or salt or a solution thereof forms the starting material for the process of the invention.

By my invention I have found that erythromycin can be isolated and purified in good yield and of desirable easily separable dense crystalline form by a new process wherein crystals of erythromycin containing certain organic solvents as structural components of the crystal lattice are employed as intermediates.

Broadly speaking, the new process is carried out as follows: A relatively concentrated water solution of erythromycin base or a salt thereof is treated with a suitable organic solvent to form a mixture from which the erythromycin is separated in solvated crystalline form. The erythromycin crystallized under these conditions appears to contain from one to three mols of organic solvent for each mol of base. The solvent is firmly incorporated into the crystal lattice occupying a definite position therein, and can be removed by mechanical means such as heating only with great difficulty. However, I have found that surprisingly the organic solvent can be removed from the crystal lattice by treating the solvated material with water. By the water treatment there is obtained either a crystalline dihydrate of erythromycin, which is a lattice compound composed of erythromycin and two mols of water, or an anhydrous erythromycin in a crystalline form which is herein designated as erythromycin anhydrate. Any of the crystalline erythromycin compounds herein described may contain water or other solvents adsorbed on the surfaces thereof or otherwise relatively loosely bound, but such loosely-bound water or other solvent is quite different from the lattice solvent of my novel solvated compounds, in that the loosely-bound solvents are readily removed by heating at relatively low temperatures.

The following broad description, in which acetone is used to exemplify the lattice-solvating agent, and solid erythromycin thiocyanate exemplifies the starting material, will illustrate the general course of my novel process. Erythromycin thiocyanate is treated with aqueous acetone, whereupon a slurry or a solution is obtained, depending upon the concentration of the acetone. Thus, for example, when about twenty percent acetone is present, a slurry is formed, whereas when the concentration of acetone is increased a solution generally results. In either case, the mixture is brought to about pH 9.5–9.8 with an alkali, such as, for example, a solution of an alkali metal hydroxide or ammonium hydroxide, to hydrolyze the thiocyanate salt to erythromycin base. A glass electrode and electronic pH meter are used to make the pH measurement, and the pH is adjusted from time to time while precipitation takes place to insure that the mother liquor remains within the stated pH range. Upon cooling after the completion of the neutralization process, a crystalline precipitate of erythromycin base is formed, generally containing two mols of acetone incorporated into the crystal lattice per mol of erythromycin. The complete precipitation of the lattice-solvated erythromycin base from the acetone solution can be accomplished in several ways, as for example, by removal of the acetone present in the mixture by evaporation in vacuo, by cooling the mixture (useful particularly if the concentration of acetone is relatively high) or by reducing the effective concentration of acetone as by the addition of water to the mixture. However, when using low-boiling solvents such as acetone, the erythromycin organic solvate is quickly converted to erythromycin base dihydrate as soon as water is added. Therefore, if recovery of the erythromycin organic solvate is to be effected, it is necessary to work rapidly at relatively low temperatures when water is added to the mixture, so that the erythromycin base-organic solvate is not converted to the erythromycin base dihydrate. As will be apparent to the art, the crystalline lattice-solvated erythromycin base can be separated as by filtration, centrifugation and the like.

By treating the lattice-solvated erythromycin with water, the lattice solvent is readily removed therefrom or replaced with water. Such removal of the solvent of solvation from the lattice-solvated crystalline erythromycin base can result in the formation of very dense crystals of erythromycin dihydrate or anhydrate. Thus, if the solvent is removed by adding to the lattice-solvated erythromycin base an amount of water while maintaining the mixture for a period of time at a temperature in the range of about 0 to 50° C., crystalline erythromycin dihydrate is formed. Preferably, I form the dihydrated crystalline erythromycin at temperatures in the range of about 40 to 50° C., as the erythromycin dihydrate approaches minimum solubility in that temperature range. When the lattice-solvated base is treated with water at about 55 to 100° C., crystalline erythromycin base anhydrate is formed. The rate of conversion from erythromycin base-organic solvate to erythromycin anhydrate or dihydrate varies directly with the temperature employed.

Alternatively, treatment with water can be accomplished without recovery of the organic-solvent solvated erythromycin base from the mixture in which it is prepared, by adding water thereto and maintaining the mixture in the temperature ranges specified hereinabove, in which case the organic solvent-solvated crystals are converted directly to crystalline erythromycin base anhydrate or dihydrate.

The organic solvents which are useful in the process of the invention, and which have been found to enter into the crystal lattice in such a way as to be firmly bound or incorporated therein are lower alkyl ketones, lower alkanols, monocarbocyclic aryl-substituted lower alkanols, water-soluble glycols, and chlorinated lower alkanes. Thus, for example, lower alkanols such as methanol, ethanol, isopropanol and butanol and including substituted lower alkanols such as benzyl alcohol, β-phenylethanol, γ-phenylpropanol, and phenylisopropanol; lower alkyl ketones such as acetone, methylethylketone, diethyl ketone and methyl propyl ketone; chlorinated alkanes such as chloroform, methylene dichloride, dichloroethane, trichloropropane; water-soluble liquid alkylene glycols or polyalkylene glycols such as ethylene glycol, propylene glycol, polyethylene glycol 400; and the like, can be employed. If mixtures of these solvents are used, the crystalline lattice-solvated erythromycin base which is isolated can be a mixture of lattice solvates corresponding to the solvents employed.

If desired, the various water and/or solvent solutions or mixtures containing erythromycin base or solvated erythromycin can be treated with purifying and color-removing adsorbents, as for example, with charcoal, fuller's earth, bentonite, aluminum oxide and the like, before isolation of the desired product.

The crystalline erythromycin anhydrate and dihydrate produced by the process of this invention have been found to be especially useful because of their density (low ratio of surface area:volume), which renders them advantageous for handling in manufacturing operations. Thus, for example, the denser crystals facilitate filtration or centrifugation. Additionally, these crystal forms are very stable and when incorporated with pharmaceutical preparations they retain their crystallinity and physical state.

The following examples will illustrate the new process and the new solvated forms of erythromycin. The powder X-ray diffraction data were obtained using unfiltered chromium radiation. In calculating the interplanar spacings, a wave-length value of 2.2896 A. was used.

Example 1

To 500 ml. of a water solution of crude erythromycin acetate containing 24,100 u./ml. were added 0.5 g. of activated carbon and 1 g. of diatomaceous earth, and the mixture was stirred for about 10 minutes. The mixture was filtered and to the filtrate were added about 100 ml. of acetone while cooling to 10° C. The pH of the mixture was then adjusted to pH 9.4 using 10 percent aqueous sodium hydroxide. The alkaline solution was stirred for about 15 minutes, maintaining the pH at 9.4 with sodium hydroxide solution, whereupon precipitation of crystalline erythromycin solvated with acetone began. Stirring was continued and the solvated erythromycin base was converted directly to crystalline erythromycin dihydrate. After no further precipitation occurred, and the temperature having risen to 21° C., stirring was discontinued and the crystalline erythromycin base dihydrate was removed by filtration and washed with water. The dense crystals were air dried at room temperature and weighed 8.1 g. Microbiological assay of the erythromycin content of the crystalline material showed activity of 920 u./mcg., and a yield of 61.7 percent of theoretical was obtained. Erythromycin dihydrate thus prepared contained 6.5 percent of water.

When the same procedure as above was carried out, except that the aqueous mixture was heated with stirring in a steam bath at about 70° C., dense crystals of erythromycin anhydrate were obtained.

Example 2

Five hundred ml. of a water solution of crude erythromycin acetate, containing a total of 12.8 million units of erythromycin assaying 618 u./mg., was chilled to about 14° C. About ⅕ volume of acetone was added to the solution, and the pH was adjusted to pH 9.5 using 20 percent aqueous sodium hydroxide. The temperature of the solution was allowed to rise slowly to about 22° C. and the alkaline solution was stirred for about 2 hours, during which time crystals of erythromycin base solvated with acetone were formed and rapidly converted without isolation to crystalline erythromycin base dihydrate. The temperature of the solution was then raised to 50° C. and the solution was stirred for an additional period of 2 hours. The crystalline erythromycin base dihydrate which formed was removed by filtration, washed with 50 ml. of warm water, and dried in vacuo at 50° C. for about 3 days. The erythromycin base dihydrate thus obtained was in the form of dense crystals which weighed 13.8 g., giving a yield of 79 percent of theoretical. Microbiological assay indicated the activity to be 830 u./mg. A powder X-ray diffraction pattern gave rise to the following values:

| "d" (Interplanar spacing) | Relative intensity |
| --- | --- |
| 23.8 | w |
| 11.8 | w |
| 9.09 | vs |
| 8.56 | vvs |
| 8.02 | w |
| 7.29 | m |
| 6.73 | s |
| 6.40 | m |
| 6.12 | s |
| 5.81 | w |
| 5.43 | m |
| 5.08 | m |
| 4.99 | m |
| 4.62 | m |
| 4.42 | m |
| 4.24 | w |
| 4.11 | m |
| 4.02 | w |

Example 3

Five hundred ml. of water containing erythromycin acetate assaying 630 u./mg., a total of 12.25 million units, were cooled to 10° C., and 100 ml. of acetone were added thereto. The pH of the solution was adjusted to 9.0 with 20 percent sodium hydroxide solution, and stirring was continued for 6 hours at this pH while the temperature was gradually raised. The temperature of the solution was increased to 50° C., and crystalline erythromycin dihydrate was recovered. A yield of about 11.2 g. of dense crystalline erythromycin dihydrate was obtained, which upon assay showed activity equal to 872 u./mg. A yield of 79.6 percent of theoretical was obtained.

When the procedure was repeated, with the exception that the reaction mixture was heated to about 70° C. on a steam bath, while stirring, dense crystals of erythromycin anhydrate were obtained.

Example 4

Fifty ml. of methylethylketone were added to 500 ml. of a water solution at about 0° C. of crude erythromycin acetate containing a total of 13.05 million units, at pH 7.0. The solution was stirred while the pH was adjusted to 9.5 using 10 percent aqueous sodium hydroxide and then the temperature was allowed to rise with stirring to 21° C. over a period of about 2 hours. Crystallization began at 0° C. and increased with the increase in temperature. Most of the crystalline methylethylketone solvated erythromycin base had precipitated by the time the temperature of the solution had increased to 21° C. The temperature was further increased to 50° C. with stirring, whereupon a further amount of crystalline, solvated erythromycin precipitated. The crystalline erythromycin base containing methylethylketone of solvation was removed by filtration. When subjected to powder X-ray diffraction analysis, the following values were obtained:

| "d" (Interplanar spacing) | Relative intensity |
| --- | --- |
| 16.5 | w |
| 14.1 | s |
| 12.9 | s |
| 9.53 | vvs |
| 7.47 | vs |
| 6.89 | m |
| 6.05 | w |
| 5.77 | m |
| 4.82 | vs |

The crystalline erythromycin methylethylketone solvate was mixed with about 195 ml. of water kept at a temperature of 50° C. and stirred for about 2 hours. Erythromycin dihydrate was thus formed. The crystals were then removed by filtration and dried in vacuo at 50° C. A total of 10.5 g. of dense crystalline erythromycin dihydrate assaying about 850 u./mg. was obtained. The yield was 68 percent of theoretical.

When the procedure was repeated, and the solvate-water mixture was heated at about 80° C. on a steam bath, erythromycin anhydrate was obtained in dense crystalline form.

*Example 5*

A mixture of 20 g. of erythromycin thiocyanate having activity of 777 u./mg. and 300 ml. of 20 percent ethanol (w./v.) was stirred at 24° C. while 5 ml. of 28 percent ammonium hydroxide solution were added. Stirring was continued for about 1½ hours, the pH of the mixture being about pH 9.81. While continuing the stirring, the temperature of the mixture was increased to 50° C., whereupon the pH dropped to 9.1. A crystalline precipitate of erythromycin solvated with ethanol was formed. The crystalline erythromycin ethanol solvate was removed by filtration and washed with 50 ml. of warm water. When dried, the powder X-ray diffraction pattern of erythromycin di-ethanol solvate gave rise to the following values:

| "d" (Interplanar spacing) | Relative intensity |
| --- | --- |
| 18.3 | vs |
| 13.3 | w |
| 10.4 | vs |
| 9.68 | vs |
| 8.48 | w |
| 8.02 | m |
| 7.35 | vs |
| 6.63 | w |
| 5.81 | vvs |
| 5.52 | w |
| 5.08 | w |
| 4.78 | w |
| 4.62 | m |
| 4.49 | w |

The crystalline erythromycin di-ethanol solvate was slurried with 10 volumes of water at 50° C., maintaining the pH of the mixture at 9.5 by addition of 5 percent sodium hydroxide solution as required, while stirring for about 1 hour. Crystalline erythromycin dihydrate was formed, and was removed by filtration and washed wtih 50 ml. of water at 50° C. 14.6 g. of dense crystalline erythromycin dihydrate were obtained assaying 889 u./mg. The yield was 83.5 percent of theoretical.

*Example 6*

A slurry was prepared from 20 g. of crystalline erythromycin thiocyanate containing 16.2 million units of erythromycin and 300 ml. of 20 percent aqueous methylethylketone. While stirring the mixture at 26° C., 5 ml. of 28 percent ammonium hydroxide solution were added. After stirring for 1 hour, the pH was 9.5. The temperature of the slurry was then raised to 50° C. and stirring was continued for a further period of 1 hour. At this point the pH of the mixture was 8.88, and the crystalline methylethylketone-solvated erythromycin base which had precipitated was removed by filtration and washed with 50 ml. of water at 50° C. The wet crystals were slurried with 10 volumes of water at 50° C. and stirring was continued for about 2 hours, during which time the methylethylketone-solvated crystals were converted to erythromycin dihydrate crystals having an average size of about 20 microns. While stirring, the pH of the mixture was maintained at 9.5 by the addition of suitable amounts of 5 percent aqueous sodium hydroxide. The dense crystalline erythromycin dihydrate thus obtained was removed by filtration, washed with 50 ml. of 50° C. water and dried. It weighed 15.7 g. after air drying. The potency of the crystals after drying was 931 u./mg., and the yield was 90 percent of theoretical.

*Example 7*

A mixture of 20 g. of crystalline erythromycin thiocyanate assaying a total of 15.5 million units and 300 ml. of water previously saturated with n-butanol was stirred while 5 ml. of 28 percent aqueous ammonium hydroxide solution were added. The pH of the mixture was about 9.75. The temperature of the slurry was then raised to 50° C. whereupon the pH dropped to 9.2. The crystalline butanol-solvated erythromycin base which formed was then removed by filtration and washed with 50 ml. of water. A portion of the crystalline erythromycin-butanol solvate was dried. When subjected to powder X-ray diffraction analysis, the following values were obtained:

| "d" (Interplanar spacing) | Relative intensity |
| --- | --- |
| 20.0 | w |
| 16.5 | w |
| 13.6 | w |
| 11.4 | w |
| 10.1 | vvs |
| 8.91 | w |
| 7.54 | m |
| 5.81 | m |
| 5.13 | s |

The wet crystals were slurried with 10 volumes of water previously warmed to 50° C. and stirred for about 1 hour while maintaining the pH at 9.5 by addition of the required amounts of 5 percent aqueous sodium hydroxide solution. Crystalline erythromycin dihydrate was formed and was removed by filtration and washed with 50 ml. of water. The dense crystals of dihydrated erythromcyin base thus obtained weighed 15.8 g. and contained 849 u./mg. of erythromycin. The yield was 86.4 percent of theoretical.

*Example 8*

A mixture of 300 ml. of 20 percent aqueous propylene glycol, 20 g. of erythromycin thiocyanate having a total activity of 15.5 million units and 5 ml. of 28 percent aqueous ammonium hydroxide solution was stirred for about 1½ hours at about 20–25° C. The pH of the mixture at 25° C. was 9.88. The temperature of the mixture was then slowly raised to 50° C. while continuing stirring, whereupon the pH dropped to 9.68. The crystals of propylene glycol solvated erythromycin base which were formed were then removed by filtration and washed with water. A portion of the crystalline material was dried and when subjected to powder X-ray diffraction analysis, the X-ray diffraction pattern gave rise to the following values:

| "d" (Interplanar spacing) | Relative intensity |
| --- | --- |
| 12.1 | m |
| 10.0 | m |
| 8.81 | vvs |
| 8.13 | m |
| 7.41 | s |
| 7.23 | m |
| 5.72 | vs |
| 5.60 | m |
| 5.19 | m |
| 4.78 | m |
| 4.53 | s |
| 4.42 | vs |

The wet crystals were slurried with 10 volumes of water at 50° C. while stirring for about 2 hours, whereupon erythromycin dihydrate crystals were formed and were removed by filtration and washed with water. After drying in air, 15.0 g. of dense crystalline erythromycin dihydrate having about 820 u./mg. activity were obtained, a yield of about 79 percent of theoretical.

*Example 9*

A mixture of 300 ml. of 20 percent aqueous polyethylene glycol 400, 20 g. of erythromycin thiocyanate containing a total activity of 15.5 million units and 5 ml. of 28 percent aqueous ammonium hydroxide solution was treated in the same manner as the preceding example. There was obtained erythromycin base solvated with polyethylene glycol, which when treated with water at 50° C. gave 14.2 g. of dense erythromycin dihydrate crystals, assaying 843 u./mg. The yield was about 77 percent of theoretical.

*Example 10*

A water solution of crude erythromycin acetate consisting of 13 million units of erythromycin in 500 ml. of water was chilled to about 0° C. and 100 ml. of ethanol was added thereto. The pH of the solution was adjusted to 9.5. The solution was permitted to warm gradually while stirring continuously and crystals formed as the temperature rose. The mixture was warmed to 50° C. with continued stirring. About 11.6 g. of crystalline erythromycin dihydrate assaying 875 u./mg. were then recovered from the mixture by filtration, followed by washing with water and drying. The yield of dense crystalline erythromycin dihydrate was about 78 percent of theoretical.

When the above procedure was carried out at a temperature of about 80° C., dense crystals of erythromycin anhydrate were obtained.

*Example 11*

Three liters of water containing 36,500 u./ml. of erythromycin were heated to 50° C. and the pH of the solution was adjusted to pH 10 using 10 percent aqueous sodium hydroxide. One liter of chloroform was added and vigorous stirring was continued for about 15 minutes. On standing, a mixture consisting of an upper water phase and a lower water-chloroform emulsion phase was formed. The chloroform-containing emulsion phase was removed and filtered on a basket centrifuge. The emulsion immediately broke into a chloroform phase and a water phase. The chloroform phase was removed, and cooled to 3° C. for a period of about 15 hours. Erythromycin crystals solvated with 2 molecules of chloroform precipitated from the cold chloroform solution. The crystals were removed by filtration and dried in air. A total amount of 119 g. of crystalline, chloroform-solvated erythromycin having activity equal to 750 u./mg. was obtained. The powder X-ray diffraction pattern of erythromycin di-chloroform solvate gave rise to the following values:

| "d" (Interplanar spacing) | Relative intensity |
| --- | --- |
| 18.3 | w |
| 9.38 | vvs |
| 8.32 | w |
| 7.41 | m |
| 5.83 | w |
| 5.77 | vs |
| 5.58 | m |
| 4.75 | m |
| 4.70 | s |
| 4.56 | m |
| 4.44 | m |
| 4.35 | w |
| 4.27 | w |
| 3.95 | w |

*Example 12*

Two hundred liters of broth obtained by the culture of *Streptomyces erythreus* for the production of erythromycin, having antibiotic activity equal to 332 units of erythromycin per ml., were filtered and the pH of the filtrate was adjusted to 10.3 with 5 percent aqueous sodium hydroxide solution. The alkaline filtrate was extracted with two 20 liter portions of chloroform at a temperature of about 50° C. A total volume of about 32 liters of chloroform extract was recovered after separation. The chloroform extract was concentrated in vacuo to a volume of about 500 ml. The concentrated extract was then cooled to 3° C. for about 48 hours, whereupon crystalline erythromycin base solvated with 2 molecules of chloroform was precipitated. The crystalline material was removed by filtration and dried in air. A total amount of 43 g. of crystalline, chloroform-solvated erythromycin, assaying 825 u./mg., was obtained.

By cooling the mother liquor from the crystallization to 3° C. over a period of several hours a second crop of crystalline erythromycin base solvated with 2 molecules of chloroform was obtained, weighing 19 g. and after air drying having activity equal to 795 u./mg.

*Example 13*

One hundred and sixty-five liters of filtered broth obtained by culture of *Streptomyces erythreus* upon a nutrient culture medium, assaying 286 u./ml. and containing 47.3 million units of activity was heated to 50° C. and the pH was adjusted to pH 10.3 using 10 percent aqueous sodium hydroxide. To the alkaline broth filtrate were then added 34 liters of ethylene dichloride, and the mixture was then slowly stirred for about 7 minutes. The ethylene dichloride phase was separated, concentrated in vacuo to about 500 ml. and placed in a chill room. On standing, crystalline erythromycin base containing 2 mols of ethylene dichloride of solvation was formed. When crystallization was completed, the crystals were removed by filtration and dried in vacuo. A yield of 55 g. of crystalline ethylene dichloride-solvated erythromycin base was recovered, having activity of 677 u./mg.; the yield was 79 percent of theoretical.

*Example 14*

Two hundred and twenty liters of a filtrate obtained from a liquid culture medium used for the culture of *Streptomyces erythreus*, and containing 72.5 million units of erythromycin, was warmed to about 45–50° C. The filtrate was adjusted to pH 10.3 by the addition of 10 percent aqueous sodium hydroxide. To the stirred alkaline filtrate were added 45 liters of trichloroethylene and the mixture was stirred for about 10 minutes. The trichloroethylene was separated from the aqueous phase, evaporated in vacuo to about 500 ml. and cooled to 4° C. Crystalline erythromycin base solvated with 2 molecules of trichloroethylene was precipitated. When precipitation was completed, the crystals were removed by filtration and dried in vacuo. A total yield of 62 g. of erythromycin base solvated with trichloroethylene, and assaying 500 u./mg., was obtained. The yield was about 50 percent of theoretical.

*Example 15*

Thirty g. of erythromycin base solvated with chloroform and prepared by the process of Example 12, were slurried with about 500 ml. of water, at a temperature of about 40° C. The mixture was stirred for about 2 hours, and filtered. Crystalline erythromycin dihydrate which was obtained in the process was dried at room temperature. A yield of about 25 g. of dense crystalline erythromycin base dihydrate assaying 860 u./mg. was obtained.

*Example 16*

Twenty-five g. of crystalline erythromycin base solvated with 2 mols of ethylene dichloride were slurried with about 500 ml. of water. The mixture was stirred for about 3 hours, while maintaining the temperature at about 80° C. by heating on a steam bath. Crystalline erythromycin base anhydrate was formed during this time. The mixture was cooled to about 10° C. and the crystalline material filtered. A total yield of about 19 g. of dense crystalline erythromycin base anhydrate assaying 940 u./mg. was recovered. The powder X-ray diffraction pattern of erythromycin base anhydrate gave rise to the following values:

| "d" (Interplanar spacing) | Relative intensity |
|---|---|
| 19.4 | w |
| 13.5 | m |
| 11.3 | s |
| 10.4 | m |
| 9.90 | s |
| 8.48 | s |
| 7.78 | m |
| 7.32 | s |
| 7.23 | s |
| 6.46 | vvs |
| 6.30 | s |
| 5.73 | vs |
| 5.19 | vs |
| 4.86 | vs |

*Example 17*

Twenty g. of crude erythromycin thiocyanate assaying 770 u./mg. were added to 77 ml. of acetone at about 50° C. and 8.5 ml. of water were added thereto. The mixture was adjusted to about pH 9.0 by the addition of 4 ml. of 20 percent aqueous sodium hydroxide solution, whereupon the erythromycin thiocyanate dissolved completely. The solution was allowed to stand at room temperature for several hours, during which time a crystalline precipitate of erythromycin base solvated with acetone formed. The crystals were removed by filtration and dried in air. When subjected to powder X-ray diffraction analysis, the following values were obtained for crystalline erythromycin acetone solvate:

| "d" (Interplanar spacing) | Relative intensity |
|---|---|
| 28.3 | s |
| 17.3 | m |
| 14.6 | vs |
| 13.3 | vvs |
| 9.79 | vs |
| 8.65 | w |
| 8.48 | w |
| 7.67 | vs |
| 7.35 | m |
| 7.06 | m |
| 5.81 | m |
| 4.91 | m |

*Example 18*

The procedure of Example 17 was repeated, except that isopropanol was used instead of acetone. The erythromycin base solvated with isopropanol was thus obtained in crystalline form.

Crystalline erythromycin isopropanol solvate gave rise to the following values when subjected to powder X-ray diffraction analysis:

| "d" (Interplanar spacing) | Relative intensity |
|---|---|
| 14.9 | s |
| 11.7 | vvs |
| 9.79 | m |
| 9.38 | m |
| 8.16 | w |
| 7.41 | vs |
| 6.91 | vs |
| 5.88 | s |
| 5.70 | s |
| 5.58 | s |
| 4.96 | s |

*Example 19*

The procedure of Example 17 was followed, except that n-propanol was employed. In this way there were obtained crystals of erythromycin base solvated with n-propanol.

When subjected to powder X-ray diffraction analysis, erythromycin n-propanol solvate gave rise to the following values:

| "d" (Interplanar spacing) | Relative intensity |
|---|---|
| 15.2 | w |
| 11.9 | vvs |
| 9.28 | m |
| 7.54 | s |
| 6.89 | vs |
| 5.88 | s |
| 5.60 | m |
| 5.05 | s |
| 4.90 | m |

I claim:

1. The process for the crystallization of erythromycin which comprises treating an aqueous solution of erythromycin base with a solvent of the group consisting of lower alkyl ketones, lower alkanols, water-soluble alkylene glycols and chlorinated alkanes to form a solid lattice-solvate of erythromycin base isolating said lattice-solvate of erythromycin; treating the said solvate with water at a temperature in the range of about 0 to 100° C. to form a crystalline erythromycin of the group consisting of erythromycin dihydrate and erythromycin anhydrate; and recovering the said crystalline erythromycin.

2. The process for the crystallization of erythromycin which comprises treating erythromycin base in aqueous solution with a solvent of the group consisting of lower alkyl ketones, lower alkanols, water-soluble alkylene gyycols and chlorinated lower alkanes to form a solid lattice-solvate of erythromycin with the said solvent isolating said lattice-solvate of erythromycin; and treating the said solvate with water at a temperature within the range of about 0 to 50° C. to form crystalline erythromycin dihydrate.

3. The process for the crystallization of erythromycin which comprises treating erythromycin base in aqueous solution with a solvent of a group consisting of lower alkanols, lower alkyl ketones, water-soluble alkylene glycols and chlorinated lower alkanes to form a solid lattice-solvate of erythromycin base with a said solvent isolating said lattice-solvate of erythromycin; and treating the said solvate with water at a temperature in the range of about 55 to 100° C. to form crystalline erythromycin anhydrate.

4. The process according to claim 1, wherein the solvent is acetone.

5. The process according to claim 1, wherein the solvent is chlorofrom.

6. The process according to claim 1, in which the solvent is ethanol.

7. The process according to claim 1, in which the solvent is methylethylketone.

8. The process according to claim 1, in which the solvent is ethylene dichloride.

References Cited in the file of this patent

UNITED STATES PATENTS

| 2,653,899 | Bunch et al. | Sept. 29, 1953 |
| 2,771,392 | Tanner et al. | Nov. 20, 1956 |

OTHER REFERENCES

Rose: Anal. Chem., vol. 26 (May 1954), pp. 938–9.